(12) United States Patent
Lee et al.

(10) Patent No.: US 8,441,601 B2
(45) Date of Patent: May 14, 2013

(54) DISPLAY APPARATUS HAVING IMPROVED BRIGHTNESS AND COLOR REPRODUCIBILITY

(75) Inventors: Sanghun Lee, Suwon-si (KR); YoungJe Cho, Asan-si (KR); Gwan-Soo Kim, Asan-si (KR); Se Ah Kwon, Seoul (KR); Dong-Uk Kang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 155 days.

(21) Appl. No.: 13/111,872

(22) Filed: May 19, 2011

(65) Prior Publication Data

US 2012/0062824 A1 Mar. 15, 2012

(30) Foreign Application Priority Data

Sep. 10, 2010 (KR) ........................ 10-2010-0089053

(51) Int. Cl.
*G02F 1/1335* (2006.01)
(52) U.S. Cl.
USPC .......................................... 349/109; 349/108

(58) Field of Classification Search ........... 349/108–109
See application file for complete search history.

(56) References Cited

U.S. PATENT DOCUMENTS

| 5,281,450 A * | 1/1994 | Yaniv ............................ 427/510 |
| 7,248,314 B2 | 7/2007 | Yun |
| 7,436,472 B2 | 10/2008 | Baek |
| 7,573,548 B2 | 8/2009 | Yang et al. |
| 2005/0134785 A1 * | 6/2005 | Roth et al. .................... 349/144 |

FOREIGN PATENT DOCUMENTS

JP 2007-178899 A 7/2007

* cited by examiner

*Primary Examiner* — Wen-Ying P Chen
(74) *Attorney, Agent, or Firm* — Innovation Counsel LLP

(57) ABSTRACT

A display apparatus includes a first substrate, a second substrate facing the first substrate, and pixels disposed between the first and second substrates to display an image. Each pixel includes a red sub-pixel for displaying a red color, a green sub-pixel for displaying a green color, a blue sub-pixel for displaying a blue color, a yellow sub-pixel for displaying a yellow color, and a white sub-pixel for displaying a white color. The blue sub-pixel has an area substantially equal to or larger than an area of each of the red, green, yellow, and white sub-pixels.

19 Claims, 4 Drawing Sheets

DISPLAY APPARATUS HAVING IMPROVED BRIGHTNESS AND COLOR REPRODUCIBILITY

CROSS-REFERENCE TO RELATED APPLICATION

This application claims priority to, and the benefit of, Korean Patent Application No. 10-2010-0089053 filed on Sep. 10, 2010, the contents of which are herein incorporated by reference in their entirety.

BACKGROUND

1. Field of Disclosure

Embodiments of the present invention relate generally to flat panel displays. More specifically, embodiments of the present invention relate to display apparatuses having improved brightness and color reproducibility.

2. Description of the Related Art

In general, a display apparatus typically includes a plurality of pixels each having a red sub-pixel that represents a red color, a green sub-pixel that represents a green color, and a blue sub-pixel that represents a blue color. The display controls the brightness of each sub-pixel, so as to display an image.

In order to increase the brightness and the color reproducibility of the display apparatus, it has recently been suggested to further include a yellow sub-pixel representing a yellow color.

When the yellow sub-pixel is added to the display apparatus, however, displayed white colors (i.e., white colors displayed according to a CIE 1931 color coordinate system) instead become yellowish, reducing image quality and making such displays undesirable.

SUMMARY

Exemplary embodiments of the present invention provide a display apparatus having red, green, blue, yellow, and white sub-pixels to provide improved brightness and color reproducibility.

According to exemplary embodiments, a display apparatus includes a first substrate, a second substrate facing the first substrate, and a plurality of pixels disposed on at least one of the first and second substrates.

Each of the pixels includes a red sub-pixel for displaying a red color, a green sub-pixel for displaying a green color, a blue sub-pixel for displaying a blue color, a yellow sub-pixel for displaying a yellow color, and a white sub-pixel for displaying a white color.

The blue sub-pixel has an area substantially equal to or larger than an area of each of the red, green, yellow, and white sub-pixels.

According to exemplary embodiments, a display apparatus includes a first substrate, a second substrate facing the first substrate, and a plurality of pixels disposed on at least one of the first and second substrates.

Each of the pixels includes two red sub-pixels displaying a red color, two green sub-pixels for displaying a green color, two blue sub-pixels for displaying a blue color, one yellow sub-pixel for displaying a yellow color, and one white sub-pixel for displaying a white color. For each of the pixels, a ratio of a sum of areas of its red sub-pixels, a sum of areas of its green sub-pixels, a sum of areas of its blue sub-pixels, an area of its yellow sub-pixel, and an area of its white sub-pixels is about 2:2:2:1:1.

According to exemplary embodiments, a display apparatus includes a first substrate, a second substrate facing the first substrate, and a plurality of pixels disposed on at least one of the first and second substrates.

Each of the pixels includes four red sub-pixels for displaying a red color, four green sub-pixels for displaying a green color, four blue sub-pixels for displaying a blue color, two yellow sub-pixels for displaying a yellow color, and two white sub-pixels for displaying a white color. For each of the pixels, a ratio of a sum of areas of its red sub-pixels, a sum of areas of its green sub-pixels, a sum of areas of its blue sub-pixels, a sum of areas of its yellow sub-pixels, and a sum of areas of its white sub-pixels is about 2:2:2:1:1.

According to the above, the display apparatus may have improved brightness and color reproducibility. In addition, a white area in which a white color is displayed according to a CIE 1931 color coordinate system may be prevented from becoming yellowish.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
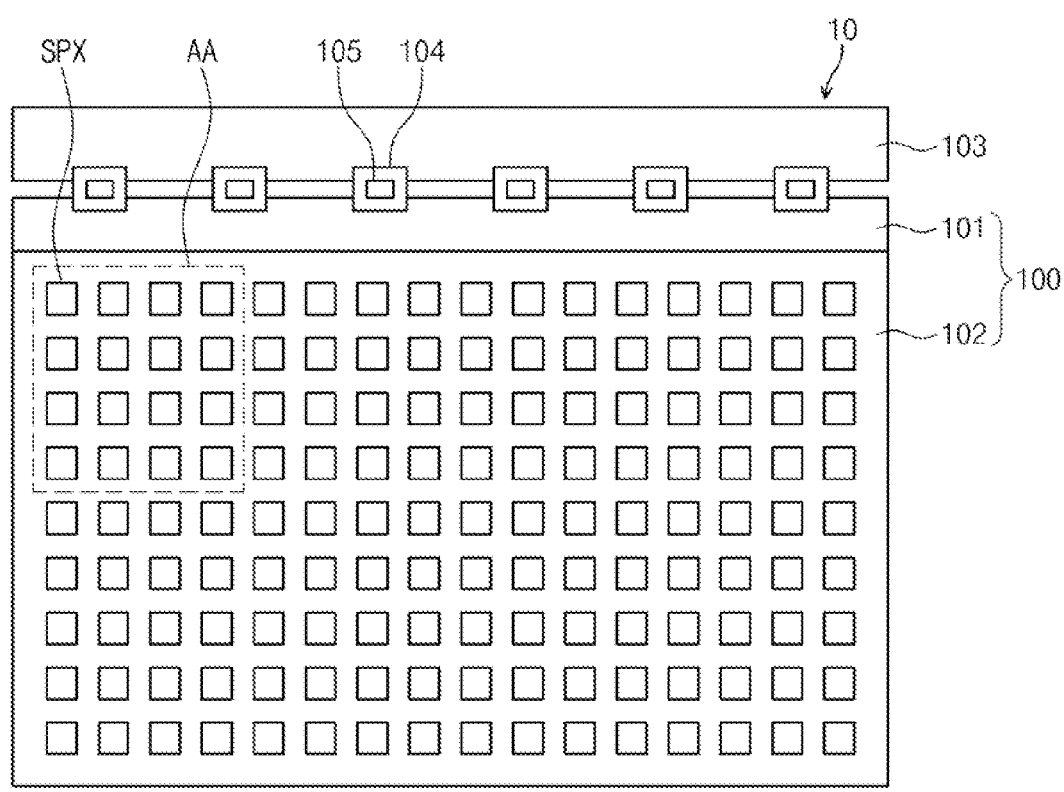
FIG. 1 is a plan view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a plan view showing a display apparatus according to an exemplary embodiment of the present invention.

Referring to FIG. 1, a display apparatus 10 includes a display panel 100 for displaying an image, and a printed circuit board 103 being disposed adjacent to one side of the display panel 100 to output a driving signal.

The display panel 100 includes a first substrate 101, a second substrate 102 positioned upon and facing the first substrate 101, and a liquid crystal layer interposed between the first and second substrates 101 and 102.

The printed circuit board 103 is connected to the display panel 100 by plural tape carrier packages 104 each having a driving chip 105 mounted thereon.

Each of the driving chips 105 may include a data driver (not shown) that outputs a data signal to the display panel 100 therein. The display panel 100 may include a gate driver (not shown) that outputs a gate signal to the display panel 100. The gate driver may be directly formed on the display panel 100 through a thin film process, although this need not necessarily be the case. In addition, the driving chips 105 may be mounted on the display panel 100 by a chip-on-glass (COG) process. In this case, the driving chips 105 may be integrated into one chip if desired.

The display panel 100 includes a plurality of sub-pixels SPX each representing a red, green, blue, yellow, or white color. For ease of explanation, 144 sub-pixels SPX have been shown in FIG. 1, but the number of the sub-pixels SPX may be decreased or increased by any amount.

Figure 2:
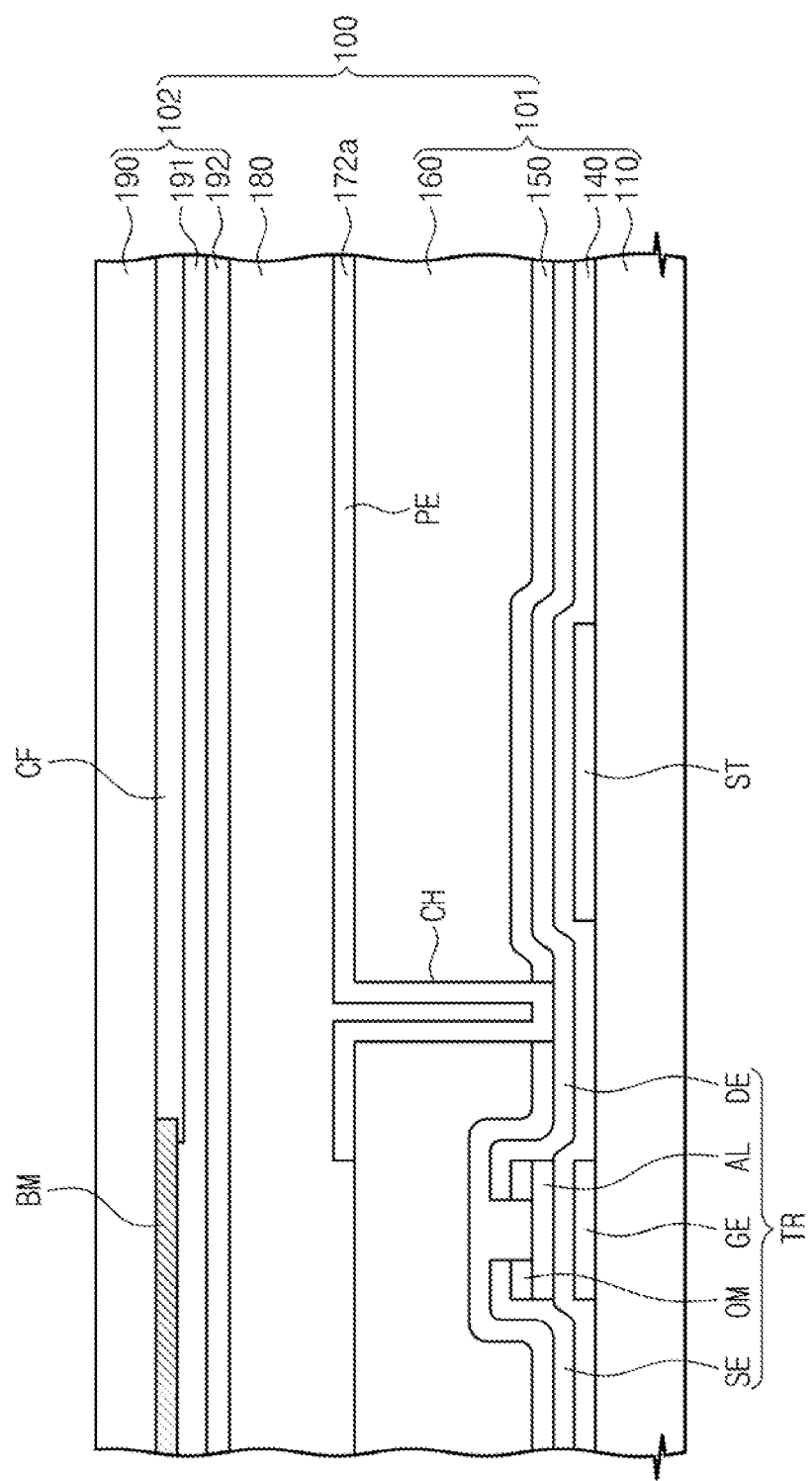
FIG. 2 is a cross-sectional view showing a display panel of FIG. 1 corresponding to one sub-pixel.

FIG. 2 is a cross-sectional view showing details of one sub-pixel SPX.

Referring to FIG. 2, the display panel 100 includes the first substrate 101, the second substrate 102 facing the first substrate 101, and a liquid crystal layer 180 disposed between the first substrate 101 and the second substrate 102.

The first substrate 101 includes a first base substrate 110, a gate electrode GE disposed on the first substrate 101, and a storage electrode ST disposed on the first base substrate 101. The gate electrode GE and the storage electrode ST are covered by an insulation layer 140. An active layer AL is disposed on the insulation layer 140 in a position corresponding to the gate electrode GE (i.e. over gate electrode GE), and an ohmic contact layer OM is disposed on the active layer AL. In addition, a source electrode SE and a drain electrode DE are formed on the insulation layer 140 and ohmic contact layer OM. The source electrode SE and drain electrode DE are spaced apart from each other and face the gate electrode GE, as shown.

The gate electrode GE, the source electrode SE, the drain electrode DE, the active layer AL, and the ohmic contact layer OM collectively form a thin film transistor TR. The thin film transistor TR may be covered by a protective layer 150. Further, an organic insulation layer 160 may be formed on the protective layer 150.

The protective layer 150 and the organic insulation layer 160 are provided with a contact hole CH formed therethrough, to expose a portion of the drain electrode DE of the thin film transistor TR.

A pixel electrode PE is disposed on the organic insulation layer 160. The pixel electrode PE is connected to the drain electrode DE through the contact hole CH.

The second substrate 102 includes a second base substrate 190, a common electrode 191, a black matrix BM, and a color filter CF.

The second base substrate 190 may include a flexible material, such as polyethylene terephthalate (PET), fiber reinforced plastic, or polyethylene naphthalate (PEN).

A black matrix BM is formed on the second base substrate 190 in a matrix form to prevent light leakage from non-display areas. The non-display areas generally correspond to areas between two adjacent pixel electrodes. The black matrix BM may be an inorganic material, such as chromium oxide (CrOx), chromium (Cr), or an organic material such as photosensitive material to which a black colorant is added.

The color filter CF may be any color, such as a red, green, blue, yellow, or white color. The color realized by the sub-pixels is decided by the color of the color filter CF. For example, if a red color filter is used, the sub-pixel disposed corresponding to the red color filter represents the red color.

The red, green, blue, and yellow color filters respectively have red, green, blue, and yellow colorants, and thus each of the red, green, blue, and yellow color filters selectively transmits the light having a wavelength or wavelengths corresponding to their specific color. In addition, an end portion of the color filter CF may overlap the black matrix BM in a plan view.

An overcoating layer 191 may be disposed on the color filter CF and the black matrix BM to act as a planarization layer, compensating for the step-difference in height between the color filter CF and the black matrix BM.

In addition, a common electrode 192 is disposed on the overcoating layer 191 to have a substantially uniform thickness. The common electrode 192 may include a transparent conductive material such as indium tin oxide (ITO) or indium zinc oxide (IZO).

The liquid crystal layer 180 may include a twisted nematic liquid crystal, a vertical alignment liquid crystal, or a cholesteric liquid crystal.

Hereinafter, the sub-pixels, e.g., a red sub-pixel R representing a red color, a green sub-pixel G representing a green color, a blue sub-pixel B representing a blue color, a yellow sub-pixel Y representing a yellow color, and a white sub-pixel W representing a white color, will be described in detail. Table 1 shown below lists values of an x-axis coordinate, a y-axis coordinate, and brightness of each of the red, green, blue, yellow, and white sub-pixels R, G, B, Y, and W according to the CIE 1931 color coordinate system (hereinafter, referred to as color coordinate) as measured from an exemplary display constructed according to the invention. In addition, Table 1 shows values of an x-axis coordinate, a y-axis coordinate in the color coordinate, and brightness of a pixel (hereinafter, referred to as an "RGB pixel") including red, green, and blue sub-pixels R, G, and B, a pixel (hereinafter, referred to as an "RGBY pixel") including red, green, blue, and yellow sub-pixels R, G, B, and Y, and a pixel (hereinafter, referred to as an "RGBYW pixel") including red, green, blue, yellow, and white sub-pixels R, G, B, Y, and W.

TABLE 1

| | | RGB pixel | RGBY pixel | RGBYW pixel |
|---|---|---|---|---|
| Red sub-pixel (R) | Brightness | 15.0 | 15.0 | 15.0 |
| | x-axis | 0.637 | 0.637 | 0.637 |
| | y-axis | 0.318 | 0.318 | 0.318 |
| Green sub-pixel (G) | Brightness | 65.7 | 65.7 | 65.7 |
| | x-axis | 0.292 | 0.292 | 0.292 |
| | y-axis | 0.638 | 0.638 | 0.638 |
| Blue sub-pixel (B) | Brightness | 9.4 | 9.4 | 9.4 |
| | x-axis | 0.156 | 0.156 | 0.156 |
| | y-axis | 0.042 | 0.042 | 0.042 |
| Yellow sub-pixel (Y) | Brightness | | 86.1 | 86.1 |
| | x-axis | | 0.410 | 0.410 |
| | y-axis | | 0.549 | 0.549 |
| White sub-pixel (W) | Brightness | | | 98.9 |
| | x-axis | | | 0.246 |
| | y-axis | | | 0.215 |
| white | Brightness | 30.0 | 44.1 | 53.2 |
| | x-axis | 0.255 | 0.301 | 0.278 |
| | y-axis | 0.242 | 0.333 | 0.285 |

The brightness, x-axis coordinate, and y-axis coordinate of the red, green, blue, yellow, and white sub-pixels R, G, B, Y, and W in the RGB pixel, the RGBY pixel, and the RGBYW are as shown in Table 1.

Referring to Table 1, in the case that the RGBY pixel is used to display a white color, the brightness of the RGBY pixel increases from about 30% to about 44.1% and the x-axis and y-axis coordinates of the white color are respectively increased by 0.046 and 0.091, as compared to the RGB pixel displaying the same white color.

In addition, in the case that the RGBYW pixel is used to display a white color, the brightness of the RGBYW pixel increases from about 30% to about 53.2% and the x-axis and y-axis coordinates of the white color are respectively increased by 0.023 and 0.043 compared to the RGB pixel displaying the same white color. In the case of the RGBYW pixel, the coordinate variation of the white color decreases and the brightness variation of the white color increases compared to those of the RGBY pixel.

Table 2, shown below, shows variations of the x-axis and y-axis coordinates of the white color in the color coordinate system when the area of each sub-pixel of the RGBYW pixel is increased by about 10%.

TABLE 2

| Sub-pixel | Change rate of area ratio | Variation of x-axis coordinate of white color | Variation of y-axis coordinate of white color |
|---|---|---|---|
| Red (R) | +10% | +0.002 | No variation |
| Green (G) | +10% | No variation | +0.003 |
| Blue (B) | +10% | −0.002 | −0.004 |
| Yellow (Y) | +10% | +0.002 | +0.004 |
| White (W) | +10% | −0.001 | −0.002 |

Referring to Table 2, when the area of the blue sub-pixel B increases, the x-axis coordinate value and the y-axis coordinate value in the color coordinate system are changed to a negative (−) value. In addition, when the areas of the red, green, and yellow sub-pixels R, G, and Y increase, the x-axis coordinate value and the y-axis coordinate value in the color coordinate system are changed to a positive (+) value.

Accordingly, when the area of the blue sub-pixel B becomes substantially equal to or larger than that of each of the red, green, yellow, and white sub-pixels R, G, Y, and W, or the area of at least one of the red, green, yellow, and white sub-pixels R, G, Y, and W becomes smaller than the area of the blue sub-pixel B, the x-axis coordinate value and the y-axis coordinate value are changed to a negative (−) value. In other words, the position of the white color, displayed by the sub-pixels, in the color coordinate may be controlled by changing the areas of the red, green, blue, yellow, and white sub-pixels R, G, B, Y, and W.

Table 3, shown below, shows x-axis and y-axis coordinate values when the red, green, blue, yellow, and white sub-pixels R, G, B, Y, and W have the area ratio of approximately 1:1:1:0.5:0.5.

TABLE 3

| | | RGB pixel | RGBYW pixel |
|---|---|---|---|
| Red sub-pixel (R) | Brightness | 15.0 | 15.0 |
| | x-axis | 0.637 | 0.637 |
| | y-axis | 0.318 | 0.318 |
| Green sub-pixel (G) | Brightness | 65.7 | 61.6 |
| | x-axis | 0.292 | 0.258 |
| | y-axis | 0.638 | 0.603 |
| Blue sub-pixel (B) | Brightness | 9.4 | 9.4 |
| | x-axis | 0.156 | 0.156 |
| | y-axis | 0.042 | 0.042 |
| Yellow sub-pixel (Y) | Brightness | | 86.1 |
| | x-axis | | 0.410 |
| | y-axis | | 0.549 |
| White sub-pixel (W) | Brightness | | 98.9 |
| | x-axis | | 0.246 |
| | y-axis | | 0.215 |
| White color | Brightness | 30.0 | 44.6 |
| | x-axis | 0.255 | 0.265 |
| | y-axis | 0.242 | 0.262 |

Referring to Table 3, when the area ratio of the red, green, blue, yellow, and white sub-pixels R, G, B, Y, and W is about 1:1:1:0.5:0.5, the brightness of the RGBYW pixel is about 14.6% (44.6-30.0) greater than the brightness of the RGB pixel, and the x-axis coordinate value and the y-axis coordinate value in the color coordinate system are respectively increased by 0.010 and 0.020 compared to the RGB pixel. When comparing the result in Table 3 to the result in Table 1, it is shown that the increase of the brightness is reduced, but the increases of the x-axis coordinate value and the y-axis coordinate value are also reduced Table 4, shown below, shows the brightness variation and the x-axis and y-axis coordinate variations as a function of the area ratio of the sub-pixels included in the RGBY pixel and the RGBYW pixel, relative to an RGB pixel having an area ratio of 1:1:1.

In further detail, Table 4 shows the brightness variation and the x-axis coordinate and y-axis coordinate variations observed when the areas of the yellow and white sub-pixels Y and W are smaller than that of other sub-pixels, the area of the blue sub-pixel B is greater than that of other sub-pixels, the areas of the red and green sub-pixels R and G are smaller than that of other sub-pixels, the area of the blue sub-pixel B is greater than that of the red and green sub-pixels R and G, and the area of the yellow and white sub-pixels Y and W is smaller than that of the red and green sub-pixels R and G.

TABLE 4

| | Area ratio | | | | | White color | | |
|---|---|---|---|---|---|---|---|---|
| | Red color (R) | Green color (G) | Blue color (B) | Yellow color (Y) | White color (W) | Variation of x-axis | Variation of y-axis | Increase amount brightness |
| RGB | 1.0 | 1.0 | 1.0 | — | — | — | — | — |
| RGBY | 1.0 | 1.0 | 1.0 | 1.0 | — | 0.046 | 0.092 | 47% |
| RGBYW | 1.0 | 1.0 | 1.0 | 1.0 | 1.0 | 0.023 | 0.043 | 77% |
| | 1.0 | 1.0 | 1.0 | 0.5 | 0.5 | 0.010 | 0.020 | 47% |
| | | | | 0.4 | 0.6 | 0.005 | 0.011 | 48% |
| | | | | 0.3 | 0.7 | 0.001 | 0.002 | 49% |
| | | | | 0.2 | 0.8 | −0.003 | −0.006 | 50% |
| | 1.0 | 1.0 | 1.3 | 1.0 | 1.0 | 0.009 | 0.018 | 71% |
| | | | 1.5 | | | 0.005 | 0.009 | 66% |
| | | | 1.7 | | | 0.001 | 0.001 | 61% |
| | | | 2.0 | | | −0.004 | −0.010 | 54% |
| | 0.7 | 0.7 | 1.0 | 1.0 | 1.0 | 0.012 | 0.020 | 87% |
| | 0.5 | 0.5 | | | | 0.008 | 0.013 | 93% |
| | 1.0 | 1.0 | 1.5 | 0.75 | 0.75 | 0.001 | 0.001 | 51% |

Referring to Table 4, when the area ratio of the red, green, blue, yellow, and white sub-pixels R, G, B, Y, and W is about 1:1:1:0.5:0.5, the x-axis coordinate variation and the y-axis coordinate variation are respectively increased by 0.010 and 0.020 and the brightness variation is increased by about 47% as compared to the RGB pixel.

Particularly, although the brightness increases by 47% or more depending on the area ratios, no significant variation in the x-axis coordinate or the y-axis coordinate exists when the area ratio of the red, green, blue, yellow, and white sub-pixels R, G, B, Y, and W is approximately 1:1:1:0.3:0.7, when the area ratio of the red, green, blue, yellow, and white sub-pixels R, G, B, Y, and W is approximately 1:1:1.7:1:1, and when the area ratio of the red, green, blue, yellow, and white sub-pixels R, G, B, Y, and W is approximately 1:1:1.5:0.75:0.75.

Figure 3:
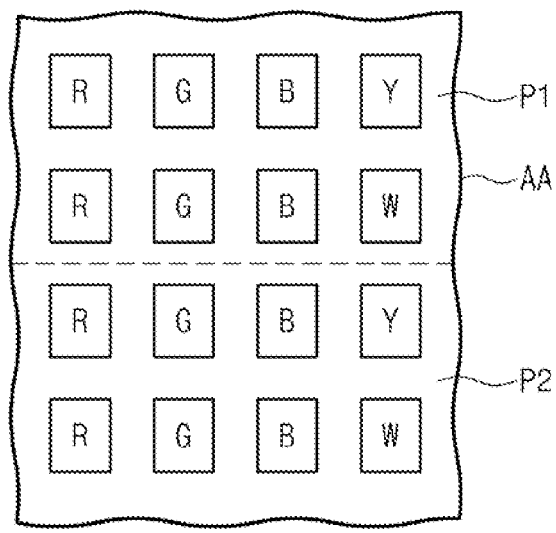
FIG. 3 is a plan view showing an exemplary embodiment of a portion AA of FIG. 1.

FIG. 3 is a close-up view showing one exemplary embodiment of portion AA of FIG. 1. Referring to FIG. 3, each of the two pixels shown includes two red sub-pixels R, two green sub-pixels G, two blue sub-pixels B, one yellow sub-pixel Y, and one white sub-pixel W. From the above, the red, green, blue, yellow, and white sub-pixels R, G, B, Y, and W of the pixel can have various area ratios that increase brightness without significant variation in x- and y-axis coordinates. The above results thus show that the number of sub-pixels, as well as their area ratios, may be controlled so as to increase brightness without sacrificing image quality. In particular, various area ratios result in increased brightness without significant x- or y-axis coordinate variation.

Figure 4:
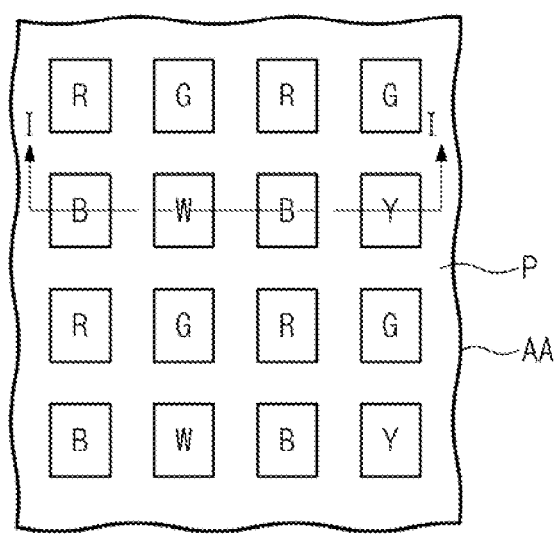
FIG. 4 is a plan view showing another exemplary embodiment of a portion AA of FIG. 1.

FIG. 4 is a close-up view showing another exemplary embodiment of portion AA of FIG. 1. FIG. 4 illustrates a single pixel that includes four sub-pixels R, four green sub-pixels G, four blue sub-pixels B, two yellow sub-pixels Y, and two white sub-pixels W. The red, green, blue, yellow, and white sub-pixels R, G, B, Y, and W included in the one pixel have the area ratio of about 1:1:1:0.5:0.5.

In FIGS. 3 and 4, the area ratio of the sub-pixels is controlled by controlling the number of the sub-pixels having the same size, but it should not be limited thereto or thereby. Also, the size of the red, green, blue, yellow, and white sub-pixels may be controlled by controlling the size of the pixel electrode or the color filter. In addition, the size of the red, green, blue, yellow, and white sub-pixels may be controlled by controlling a width of the black matrix.

Figure 5:
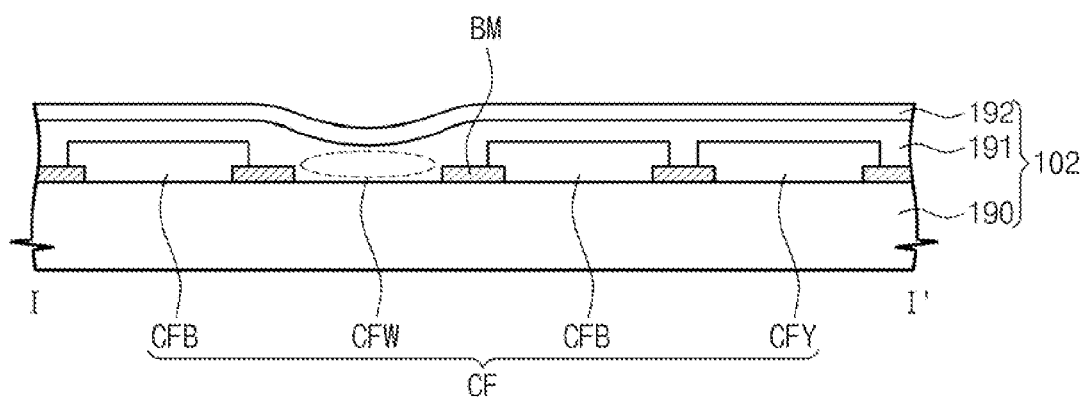
FIG. 5 is a cross-sectional view taken along a line I-I' of FIG. 4.

FIG. 5 is a cross-sectional view taken along a line I-I' of FIG. 4. For ease of explanation, only second substrate 102 has been shown in FIG. 5. Referring to FIG. 5, the second substrate 102 includes the second base substrate 190, the black matrix BM, the color filter CF, the overcoating layer 191, and the common electrode 192.

The black matrix BM is disposed in and/or defines the non-display area. The color filter CF includes red, green, blue, and yellow color filters CFR, CFG, CFB, and CFY disposed on second base substrate 190 and respectively corresponding to and/or defining the red, green, blue, and yellow sub-pixels R, G, B, and Y in the display area. In FIG. 5, only the blue and yellow color filters CFB and CFY have been shown, although the filters of other colors are arranged in similar manner.

The overcoating layer 191 is disposed on the color filter CF and the black matrix BM to compensate for the step-difference between the color filter CF and the black matrix BM. In FIG. 5, a transparent filter CFW, which is formed by omitting a color filter or which can be alternatively thought of as using a portion of the overcoating layer 191, is disposed to form the white sub-pixel W. Accordingly, no additional transparent filter is required, so the manufacturing process for the display apparatus may be simplified and the manufacturing cost for the display apparatus may be reduced.

Referring to FIG. 3 again, the RGB pixel includes the green sub-pixel G having the x-axis coordinate value of 0.292 and the y-axis coordinate value of 0.683 in the color coordinate system, but the RGBYW pixel includes the green sub-pixel G having the x-axis coordinate value of 0.258 and the y-axis coordinate value of 0.638 in the color coordinate system.

In general, the color filter includes a pigment to display a desired color. For instance, the green color filter can include a green pigment of G36 and G58 and a yellow pigment of Y150 or Y139. However, since the RGBYW pixel employs a yellow sub-pixel Y, the amount of yellow pigment in the green color filter CFG may be decreased. In further detail, a mixture ratio of the yellow pigment to the green pigment in the green color filter CFG of an RGBYW pixel may be larger than zero (0) and may be equal to or smaller than 0.25. Further, the green color filter CFG may include only green pigment without including the yellow pigment.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
 a first substrate;
 a second substrate facing the first substrate; and
 a plurality of pixels disposed on at least one of the first and second substrates to display an image,
 each pixel comprising:
  a red sub-pixel for displaying a red color;
  a green sub-pixel for displaying a green color;
  a blue sub-pixel for displaying a blue color;
  a yellow sub-pixel for displaying a yellow color; and
  a white sub-pixel for displaying a white color,
 wherein the blue sub-pixel has an area larger than an area of each of the red, green, yellow, and white sub-pixels.

2. The display apparatus of claim 1, wherein the red sub-pixel has an area substantially equal to an area of each of the green and blue sub-pixels, and an area of each of the yellow and white sub-pixels is smaller than the area of the red sub-pixel.

3. The display apparatus of claim 2, wherein the red, green, blue, yellow, and white sub-pixels have an area ratio of about 1:1:1:y:w, where the y is larger than 0 and smaller than 1, and a sum of the y and the w is equal to or larger than 0.5 and equal to or smaller than 1.

4. The display apparatus of claim 2, wherein the white sub-pixel has an area substantially equal to or larger than an area of the yellow sub-pixel.

5. The display apparatus of claim 4, wherein the red, green, blue, yellow, and white sub-pixels have an area ratio of about 1:1:1:0.3:0.7.

6. The display apparatus of claim 1, wherein the red, green, blue, yellow, and white sub-pixels have an area ratio of about 1:1:b:1:1, where b is larger than 1 and smaller than 2.

7. The display apparatus of claim 6, wherein the b is about 1.7.

8. The display apparatus of claim 1, wherein the blue sub-pixel has an area substantially equal to an area of each of the yellow and white sub-pixels, and each of the red and green sub-pixels has an area smaller than the area of the blue sub-pixel.

9. The display apparatus of claim 8, wherein the red, green, blue, yellow, and blue sub-pixels have an area ratio of about r:g:1:1:1, where the r is larger than 0 and smaller than 1, and the g is larger than 0 and smaller than 1.

10. The display apparatus of claim 9, wherein each of the r and the g is about 0.5.

11. The display apparatus of claim 1, wherein the red sub-pixel has an area substantially equal to an area of the green sub-pixel, the blue sub-pixel has an area larger than an area of the red sub-pixel, and each of the yellow and white sub-pixels has an area smaller than the area of the red sub-pixel.

12. The display apparatus of claim 11, wherein the red, green, blue, yellow, and white sub-pixels have an area ratio of about 1:1:1.5:0.75:0.75.

13. The display apparatus of claim 1, wherein at least one of the first and second substrates comprises:
 a base substrate;
 a plurality of color filters disposed on the base substrate and spaced apart from each other; and
 an overcoating layer disposed on the color filters and the base substrate.

14. The display apparatus of claim 13, wherein the color filters comprise:
 a red color filter disposed in the red sub-pixel;
 a green color filter disposed in the green sub-pixel;
 a blue color filter disposed in the blue sub-pixel; and
 a yellow color filter disposed in the yellow sub-pixel.

15. The display apparatus of claim 14, wherein a portion of the overcoating layer is disposed on the base substrate in the white sub-pixel.

16. The display apparatus of claim 14, wherein the green color filter comprises a green pigment and a yellow pigment, and a mixture ratio of the yellow pigment to the green pigment is larger than 0 and equal to or smaller than 0.25.

17. The display apparatus of claim 14, wherein the green color filter does not have yellow pigment.

18. A display apparatus comprising:
 a first substrate;
 a second substrate facing the first substrate; and
 a plurality of pixels disposed on at least one of the first and second substrates,
 wherein each of the pixels comprises two red sub-pixels for displaying a red color, two green sub-pixels for displaying a green color, two blue sub-pixels for displaying a blue color, one yellow sub-pixel for displaying a yellow color, and one white sub-pixel for displaying a white color, and
 wherein, for each of the pixels, a ratio of a sum of areas of its red sub-pixels, a sum of areas of its green sub-pixels, a sum of areas of its blue sub-pixels, an area of its yellow sub-pixel, and an area of its white sub-pixel is about 2:2:2:1:1.

19. A display apparatus comprising:
 a first substrate;
 a second substrate facing the first substrate; and
 a plurality of pixels disposed on at least one of the first and second substrates,
 wherein each of the pixels comprises four red sub-pixels for displaying a red color, four green sub-pixels for displaying a green color, four blue sub-pixels for displaying a blue color, two yellow sub-pixels for displaying a yellow color, and two white sub-pixels for displaying a white color, and
 wherein, for each of the pixels, a ratio of a sum of areas of its red sub-pixels, a sum of areas of its green sub-pixels, a sum of areas of its blue sub-pixels, a sum of areas of its yellow sub-pixels, and a sum of areas of its white sub-pixels is about 2:2:2:1:1.

* * * * *